United States Patent
Enomoto

(10) Patent No.: US 10,760,542 B2
(45) Date of Patent: Sep. 1, 2020

(54) CONTROLLER AND CONTROL METHOD FOR INTERNAL COMBUSTION ENGINE

(71) Applicant: TOYOTA JIDOSHA KABUSHIKI KAISHA, Toyota-shi, Aichi-ken (JP)

(72) Inventor: Hiroshi Enomoto, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 72 days.

(21) Appl. No.: 16/058,270

(22) Filed: Aug. 8, 2018

(65) Prior Publication Data

US 2019/0113015 A1   Apr. 18, 2019

(30) Foreign Application Priority Data

Oct. 12, 2017   (JP) .................................. 2017-198692

(51) Int. Cl.
  *F02N 99/00*   (2010.01)
  *F02N 11/08*   (2006.01)
  *F02N 11/00*   (2006.01)

(52) U.S. Cl.
  CPC ........ *F02N 99/006* (2013.01); *F02N 11/0814* (2013.01); *F02N 11/0844* (2013.01); *F02N 11/00* (2013.01); *F02N 2200/02* (2013.01); *F02N 2200/022* (2013.01); *F02N 2200/023* (2013.01); *F02N 2200/08* (2013.01); *F02N 2200/102* (2013.01); *F02N 2200/12* (2013.01); *F02N 2250/04* (2013.01); *F02N 2300/102* (2013.01)

(58) Field of Classification Search
  CPC ............. F02N 11/0825; F02N 11/0818; F02N 99/002; F02N 99/006; F02N 2200/023; F02N 2200/046; F02N 2300/2002; F02N 11/0844

See application file for complete search history.

(56) References Cited

U.S. PATENT DOCUMENTS

| 2003/0101956 A1* | 6/2003 | Sieber ...................... F02N 9/02 123/179.5 |
| 2004/0200448 A1* | 10/2004 | Kojima ............... F02N 11/0851 123/179.3 |
| 2005/0109302 A1 | 5/2005 | Tetsuno et al. |
| 2006/0180112 A1* | 8/2006 | Katayama ............. F02D 41/065 123/179.4 |

(Continued)

FOREIGN PATENT DOCUMENTS

| JP | 2005-155362 A | 6/2005 |
| JP | 2016-156323 A | 9/2016 |

*Primary Examiner* — Sizo B Vilakazi
*Assistant Examiner* — Anthony L Bacon
(74) *Attorney, Agent, or Firm* — Oliff PLC

(57) ABSTRACT

In response to a restarting request generated during a stopping period, in which fuel injection is stopped to automatically stop engine operation, either starter starting or combustion starting is selected. In the starter starting, the engine is restarted using a starter motor. In the combustion starting, the engine is restarted through fuel injection and ignition without using the starter motor. If the rotational resistance acting on the crankshaft is determined to be of such a magnitude that the combustion starting is impossible, the starter starting is carried out in response to the restarting request generated during the stopping period.

7 Claims, 4 Drawing Sheets

(56) References Cited

U.S. PATENT DOCUMENTS

| | | | | |
|---|---|---|---|---|
| 2007/0107416 A1* | 5/2007 | Udono | ................ | F02D 41/0235 |
| | | | | 60/284 |
| 2011/0172900 A1* | 7/2011 | Mukaihara | ............ | F02D 35/023 |
| | | | | 701/112 |
| 2015/0107555 A1* | 4/2015 | Rai | ......................... | F02D 13/08 |
| | | | | 123/350 |
| 2016/0208761 A1* | 7/2016 | Nagai | .................... | B60K 6/387 |

* cited by examiner

CONTROLLER AND CONTROL METHOD FOR INTERNAL COMBUSTION ENGINE

BACKGROUND

The present disclosure relates to a controller and a control method for an internal combustion engine that perform combustion starting, through which engine is started without using the starter motor.

Japanese Laid-Open Patent Publication No. 2005-155362 discloses a controller that performs combustion starting in response to a restarting request generated in a stopping period when the crankshaft is rotating inertially after fuel injection is stopped. The combustion starting is restarting of the internal combustion engine by resuming fuel injection and performing ignition without using the starter motor.

When the engine is in the stopping period and rotating at a low engine speed, specifically, when the inertial rotation force of the crankshaft is smaller than the compression reaction force acting on a cylinder in a compression stroke and thus the piston cannot pass the top dead center, the controller injects fuel into another cylinder that is in an expansion stroke.

The controller then performs ignition in that cylinder to apply torque to the crankshaft in the forward rotational direction such that the torque in the forward rotational direction exceeds the compression reaction force. In this manner, the engine is restarted without using the starter motor.

SUMMARY

However, if great rotational resistance acts on the crankshaft, the torque in the forward rotational direction, which is applied to the crankshaft through fuel injection into the cylinder in the expansion stroke, cannot exceed the compression reaction force. This may cause a failure of the engine restarting.

Even if the combustion starting is performed by injecting fuel into a cylinder in a compression stroke to restart the engine, a great rotational resistance acting on the crankshaft may cause the torque in the forward rotational direction to be smaller than the compression reaction force. The crankshaft thus may rotate in the reverse rotational direction before ignition occurs, causing a failure of the engine restarting.

Examples of the present disclosure will now be described.

Example 1

A controller for an internal combustion engine is provided. The engine includes a direct injection valve, a spark plug, and a starter motor. The controller includes a starting method switching section. The starting method switching section is configured to select and perform either starter starting or combustion starting in response to a restarting request generated during a stopping period, in which fuel injection is stopped to automatically stop engine operation. The starting method switching section is configured to restart the engine using the starter motor in the starter starting and to restart the engine through the fuel injection and ignition without using the starter motor in the combustion starting. The controller is configured to perform a determining process for determining whether a rotational resistance acting on a crankshaft of the engine is of such a magnitude that the combustion starting is impossible. The starting method switching section is configured to carry out the starter starting in response to the restarting request generated during the stopping period if, through the determining process, the rotational resistance is determined to be of such a magnitude that the combustion starting is impossible.

In the above-described configuration, the combustion starting is not performed if the rotational resistance of the crankshaft is determined to be of such a magnitude that the combustion starting is impossible. Instead, the starter starting is carried out. The starter starting uses the torque of the starter motor and thus ensures successful engine restarting more reliably than the combustion starting. The engine restarting is thus unlikely to fail despite the great rotational resistance of the crankshaft.

Example 2

The above-described engine is a vehicle-mounted internal combustion engine mounted in a vehicle as a drive source. The controller is configured to determine, in the determining process, that the rotational resistance is of such a magnitude that the combustion starting is impossible if an integrated travel distance of the vehicle is smaller than a determination distance.

Immediately after an engine is produced, the slidable portions are yet to be sufficiently settled into the engine and cause a great rotational resistance to the crankshaft. As the integrated operating amount of the engine increases, the slidable portions become sufficiently settled in, thus decreasing the rotational resistance to the crankshaft. If the integrated travel distance of the vehicle is small, it is estimated that the integrated operating amount of the engine is small and the rotational resistance of the crankshaft is great. Therefore, as in the above-described configuration, the rotational resistance of the crankshaft can be determined to be of such a magnitude that the combustion starting is impossible based on the integrated travel distance of the vehicle.

Example 3

The above-described controller is configured to determine, in the determining process, that the rotational resistance is of such a magnitude that the combustion starting is impossible if the temperature of an engine coolant is lower than a determination coolant temperature.

When the temperature of engine coolant is low, the temperature of lubricant is also low and the rotational resistance of the crankshaft is great. Therefore, if the temperature of engine coolant is low, it is estimated that the rotational resistance of the crankshaft is great. Therefore, as in the above-described configuration, the rotational resistance of the crankshaft can be determined to be of such a magnitude that the combustion starting is impossible based on the temperature of engine coolant.

Example 4

The above-described controller is further configured to perform an idle-speed control for adjusting an engine speed by correcting an opening degree of a throttle valve of the engine during idling. The controller is configured to determine, in the determining process, that the rotational resistance is of such a magnitude that the combustion starting is impossible if a correction amount used to increase the opening degree of the throttle valve in the idle-speed control before the fuel injection is stopped to switch to the stopping period is greater than or equal to a determination value.

When a great rotational resistance acts on the crankshaft, the opening degree of the throttle valve is corrected to increase through the idle-speed control such that the engine speed is maintained. That is, the greater the rotational resistance of the crankshaft, the greater becomes the correction amount used to increase the opening degree of the throttle valve in the idle-speed control. Therefore, as in the above-described configuration, the rotational resistance of the crankshaft can be determined to be of such a magnitude that the combustion starting is impossible based on the correction amount used to increase the opening degree of the throttle valve in the idle-speed control.

Example 5

A first reverse rotation time is defined as when the crankshaft is rotating in a reverse rotational direction after a piston of a cylinder in a compression stroke cannot pass a top dead center and a rotational direction of the crankshaft is switched from a forward rotational direction to a reverse rotational direction for the first time in the stopping period. The controller is configured to: during the first reverse rotation time, produce a torque in the forward rotational direction in the combustion starting by injecting fuel into a cylinder in an expansion stroke and igniting air-fuel mixture that has been compressed through rotation in the reverse rotational direction; and perform the determining process only during the first reverse rotation time.

If the combustion starting is performed during the first reverse rotation time, in which the crankshaft is rotating in the reverse rotational direction, the crankshaft must be pushed back to the forward rotational direction through fuel injection and ignition. The combustion starting thus tends to be influenced by the rotational resistance acting on the crankshaft and is likely to fail if the rotational resistance is great.

Therefore, as in the above-described configuration, the controller may perform, only during the first reverse rotation time, the determining process, in which the controller determines whether the rotational resistance acting on the crankshaft is of such a magnitude that the combustion starting is impossible.

Example 6

A first reverse rotation time is defined as when the crankshaft is rotating in a reverse rotational direction after a piston of a cylinder in a compression stroke cannot pass a top dead center and a rotational direction of the crankshaft is switched from a forward rotational direction to a reverse rotational direction for the first time in the stopping period. The controller is further configured to: during the first reverse rotation time, produce a torque in the forward rotational direction in the combustion starting by injecting fuel into a cylinder in an expansion stroke and igniting air-fuel mixture that has been compressed through rotation in the reverse rotational direction; and also, during the first reverse rotation time, obtain a peak reverse rotational speed, which is an extreme value of an angular speed of the crankshaft, and carry out a compression determining process for determining that the combustion starting is impossible based on the fact that an absolute value of the obtained peak reverse rotational speed is smaller than a determination speed. The starting method switching section is configured to perform the starter starting in response to a restarting request generated during the stopping period if the combustion starting is determined to be impossible through the compression determining process.

To produce torque in the forward rotational direction by injecting fuel into the cylinder in the expansion stroke in the combustion starting during the first reverse rotation time, the rotation in the reverse rotational direction must bring the piston close to the top dead center in the cylinder in the expansion stroke and thus the pressure in the cylinder must be sufficiently increased.

If the absolute value of the peak reverse rotational speed is small during the first reverse rotation time, the inertial rotation force in the reverse rotational direction is small. The piston is thus unlikely to be brought close to the top dead center in the cylinder in the expansion stroke and the combustion starting is likely to fail.

Therefore, as in the above-described configuration, the peak reverse rotational speed is obtained and, based on the absolute value of the peak reverse rotational speed, a determination is made as to whether the combustion starting is impossible. This enables a determination in advance as to whether combustion starting at a later stage is performable, thus ensuring selection of a suitable starting method in response to a restarting request based on the determination.

Example 7

A control method for an internal combustion engine is provided that performs the various processes described in Examples 1 to 6.

Example 8

A non-transitory computer readable memory medium is provided that stores a program that causes a processing device to perform the various processes described in Examples 1 to 6.

Other aspects and advantages of the present disclosure will become apparent from the following description, taken in conjunction with the accompanying drawings, illustrating exemplary embodiments.

BRIEF DESCRIPTION OF THE DRAWINGS

The disclosure may be understood by reference to the following description together with the accompanying drawings.

DETAILED DESCRIPTION

A controller (control device) 60 for an internal combustion engine 1 according to one embodiment will now be described with reference to FIGS. 1 to 5.

Figure 1:
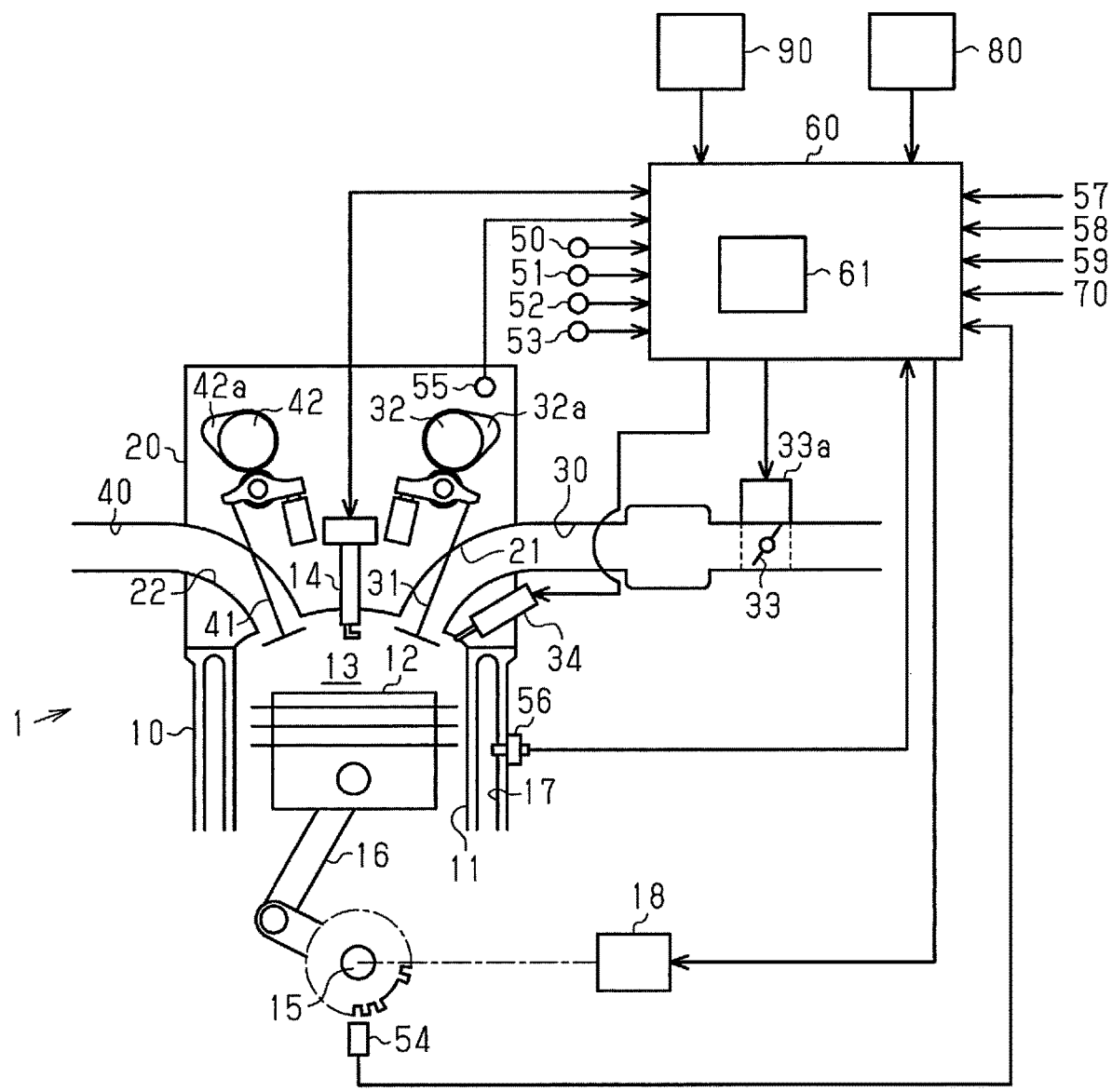
FIG. 1 is a schematic diagram representing the configuration of a controller for an internal combustion engine and the configuration of an internal combustion engine to be controlled by the controller.

The internal combustion engine 1 is controlled by the controller 60 according to the present embodiment and is a vehicle-mounted internal combustion engine mounted in a vehicle as a drive source. Also, the engine 1 is an inline-four-cylinder engine including four, first to fourth, cylinders 11. FIG. 1 shows only one of the four cylinders 11.

As shown in FIG. 1, the cylinders 11 are formed in a cylinder block 10 of the engine 1 and each accommodate a piston 12 in a reciprocally movable manner. The cylinder block 10 also has a water jacket 17 around the cylinders 11 and coolant circulates in the water jacket 17.

As illustrated in the lower section of FIG. 1, the piston 12 is coupled to a crankshaft 15 through a connecting rod 16. The engine 1 has a starter motor 18 to drive the crankshaft 15 to start the engine 1.

A cylinder head 20 is mounted to the upper end of the cylinder block 10. A combustion chamber 13 is thus defined by the inner peripheral surface of each cylinder 11, the top surface of the corresponding piston 12, and the lower surface of the cylinder head 20. Spark plugs 14 are each arranged in the cylinder head 20 to have a distal end exposed in the corresponding combustion chamber 13. The cylinder head 20 also has intake ports 21 and exhaust ports 22. Each of the intake ports 21 and the associated one of the exhaust ports 22 communicate with the corresponding one of the combustion chambers 13. Each intake port 21 configures a section of an intake passage 30. Each exhaust port 22 configures a section of an exhaust passage 40. Further, direct injection valves 34 are arranged in the cylinder head 20, one by one in correspondence with the respective cylinders 11, to inject fuel into the corresponding combustion chambers 13.

With reference to FIG. 1, a throttle valve 33 is arranged in the intake passage 30 and driven by a motor 33*a* to regulate the amount of the air introduced into each combustion chamber 13, which is the intake air amount GA.

Intake valves 31 and exhaust valves 41 are installed in the cylinder head 20. Each of the intake valves 31 selectively opens and closes the corresponding one of the intake ports 21 to permit or interrupt communication between the intake passage 30 and the associated one of the combustion chambers 13. Each of the exhaust valves 41 selectively opens and closes the corresponding one of the exhaust ports 22 to permit or interrupt communication between the exhaust passage 40 and the associated one of the combustion chambers 13. Each of the valves 31, 41 is urged constantly by the urging force of a valve spring in a closing direction.

On the other hand, an intake camshaft 32 and an exhaust camshaft 42 are rotationally supported by the cylinder head 20. Intake cams 32*a* are arranged in the intake camshaft 32 and urge the intake valves 31 in the opening direction. Exhaust cams 42*a* are arranged the exhaust camshaft 42 and urge the exhaust valves 41 in the opening direction.

The intake camshaft 32 and the exhaust camshaft 42 are coupled to the crankshaft 15 through a timing chain to rotate two turns as the crankshaft 15 rotates one turn. As a result, when the engine is in operation and the crankshaft 15 rotates, the intake camshaft 32 and the exhaust camshaft 42 rotate correspondingly. The intake cams 32*a* and the exhaust cams 42*a* thus operate to open the intake valves 31 and the exhaust valves 41, respectively.

Various sensors and switches for detecting states of corresponding components are attached to the engine 1 or the vehicle employing the engine 1. For example, a vehicle speed sensor 50 detects the vehicle speed SPD based on the rotational speed of the wheels rotated by the drive force of the engine 1. An accelerator sensor 51 detects the accelerator operating amount ACCP, which is the operating amount of the accelerator pedal by the driver. A throttle position sensor 52 detects the throttle opening degree TA, which is the opening degree of a throttle valve 33. An airflow meter 53 detects the intake air amount GA, which is the amount of the air introduced into each combustion chamber 13 via the intake passage 30.

As shown in the lower section of FIG. 1, a crank position sensor 54 is arranged in the vicinity of the crankshaft 15 and outputs a pulse signal each time the crankshaft 15 rotates a predetermined rotation angle. The crank position sensor 54 is a type of sensor capable of identifying the rotating direction of the crankshaft 15.

A cam position sensor 55 is arranged in the vicinity of the intake camshaft 32 and outputs a pulse signal each time the rotational phase of the intake camshaft 32 corresponds to a predetermined phase. A coolant-temperature sensor 46 is arranged in the cylinder block 10 and detects the coolant temperature ThW, which is the temperature of the engine coolant circulating in the water jacket 17.

An odometer 57 detects the integrated travel distance Od of the vehicle employing the engine 1. A brake switch 58 detects depression of the brake pedal. A shift position sensor 59 detects the shift position of the transmission of the vehicle employing the engine 1.

The controller 60 controls the engine 1 in an integrated manner. The aforementioned sensors and switch are connected to the controller 60. The controller 60 reads in detection signals from the sensors and switch and performs various calculation processes related to the engine control. In correspondence with the results of the calculation processes, the controller 60 controls the corresponding components of the engine 1.

Specifically, based on the pulse signals output by the crank position sensor 54 and the cam position sensor 55, the controller 60 performs cylinder determination for determining which of the intake stroke, the compression stroke, the combustion stroke, and the exhaust stroke each respective cylinder 11 is in. Also, based on the aforementioned pulse signals, the controller 60 also detects the crank angle CA, which is the rotation angle of the crankshaft 15. Based on the detected crank angle CA, the controller 60 controls the direct injection valves 34 and the ignition plugs 14, which are arranged in correspondence with the respective cylinders 11.

Further, with reference to the pulse signal output by the crank position sensor 54, the controller 60 calculates the engine speed NE, which is the rotational speed of the crankshaft 15. In correspondence with the engine speed NE and the accelerator operating amount ACCP, the controller 60 controls the motor 33*a* to drive the throttle valve 33, regulating the intake air amount GA. The controller 60 also controls the opening period of each of the direct injection valve 34 in correspondence with the intake air amount GA to regulate the fuel injection amount. Specifically, the engine speed NE has a positive value when the crankshaft 15 is rotating in the forward rotational direction and a negative value when the crankshaft 15 is rotating in the reverse rotational direction.

The controller 60 performs idle-speed control for adjusting the engine speed NE during idling by correcting the opening degree of the throttle valve 33 during the idling. In the idle-speed control, to maintain the engine speed NE during idling at a target engine speed, an ISC correction amount is added to the basic opening degree of the throttle valve 33 to adjust its opening degree. The ISC correction amount is a correction amount used to increase the opening degree of the throttle valve 33. That is, if the engine speed NE during idling is lower than the target engine speed, a greater ISC correction amount is employed to increase the degree of the throttle valve 33. If the engine speed NE during idling is higher than the target engine speed, a smaller ISC correction amount is employed to reduce the opening degree of the throttle valve 33.

An ignition switch 70, an alternator 80, and an air conditioner 90 are also connected to the controller 60. The ignition switch 70 is turned on to supply electric power to the controller 60. The controller 60 thus detects an engine starting request and executes starting control for starting the engine 1. If the engine 1 is in operation and the ignition switch 70 is turned off, the controller 60 detects an engine stop request and performs an engine stopping process for stopping the engine operation. After the engine stopping process is performed to stop the engine operation, electric power supply to the controller 60 is stopped. Besides, the controller 60 is informed of the operating states of the alternator 80 and the air conditioner 90.

The controller 60 detects manipulation by the driver and automatically stops the engine operation when, for example, the vehicle stops at a red light at an intersection. On the other hand, if the driver's manipulation indicates starting of the vehicle, the controller 60 executes automatic stopping-starting control for automatically restarting the engine 1 to resume engine operation.

Specifically, the controller 60 stops fuel injection to stop the engine 1 when predetermined stopping conditions are satisfied during the engine operation and a stop request is thus generated. For example, if the vehicle speed SPD is lower than a predetermined speed, the brake pedal is depressed, the accelerator operating amount ACCP is zero, and any particular inconvenience is not detected against stopping the engine 1, the controller 60 determines that a stop request has been generated and stops fuel injection to stop the engine operation.

In contrast, when predetermined starting conditions are satisfied to generate a restarting request, the controller 60 automatically restarts the engine 1. For example, when the brake pedal is released, the accelerator operating amount ACCP becomes greater than zero, or engine operation is required to operate the air conditioner 90 or the alternator 80, the engine 1 is automatically restarted.

By executing the automatic stopping-starting control, continuous idling for a prolonged time is restrained to decrease the fuel consumption amount, exhaust gas emission, and noise caused by idling.

The controller 60 restarts the engine 1 through the automatic stopping-starting control selectively using starter starting and combustion starting. The starter starting is restarting of the engine 1 using the starter motor 18. The combustion starting is restarting of the engine 1 through fuel injection and ignition without using the starter motor 18. The controller 60 has a starting method switching section 61 to switch between the starting methods to restart the engine 1.

In the starter starting, the controller 60 rotates the crankshaft 15 by means of the starter motor 18, thus performing cranking. Also, the controller 60 carries out fuel injection and ignition near the compression top dead center to restart the engine 1.

In contrast, in the combustion starting, the controller 60 restarts the engine 1 by carrying out fuel injection and ignition without performing cranking by means of the starter motor 18. Specifically, the combustion starting includes multiple modes. The controller 60 determines, depending on the state of the engine 1, in which of the modes the combustion starting should be carried out.

Figure 2:
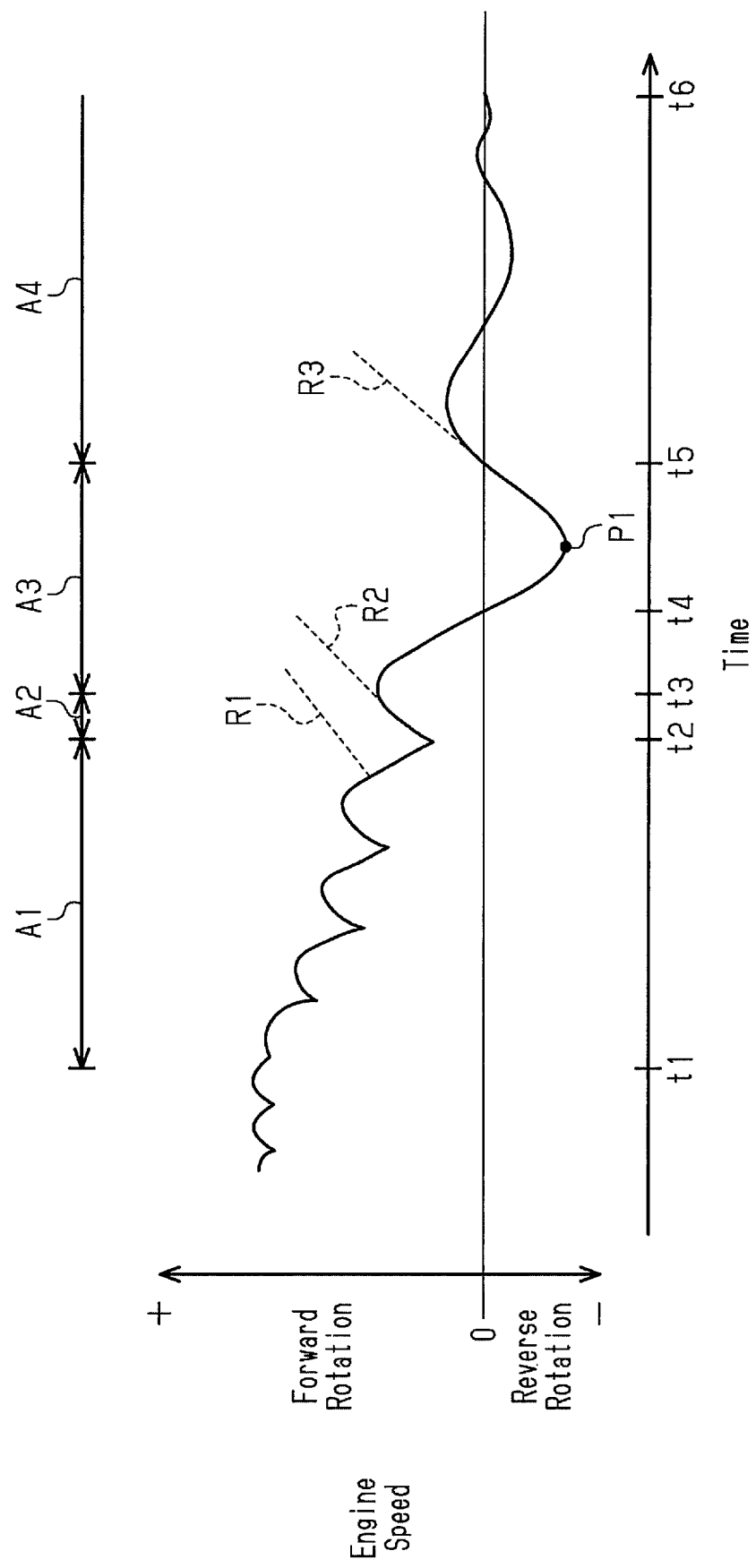
FIG. 2 is a timing diagram representing movements of the engine speed of the engine illustrated in FIG. 1 when the engine is in a stopping period.
Figure 3:
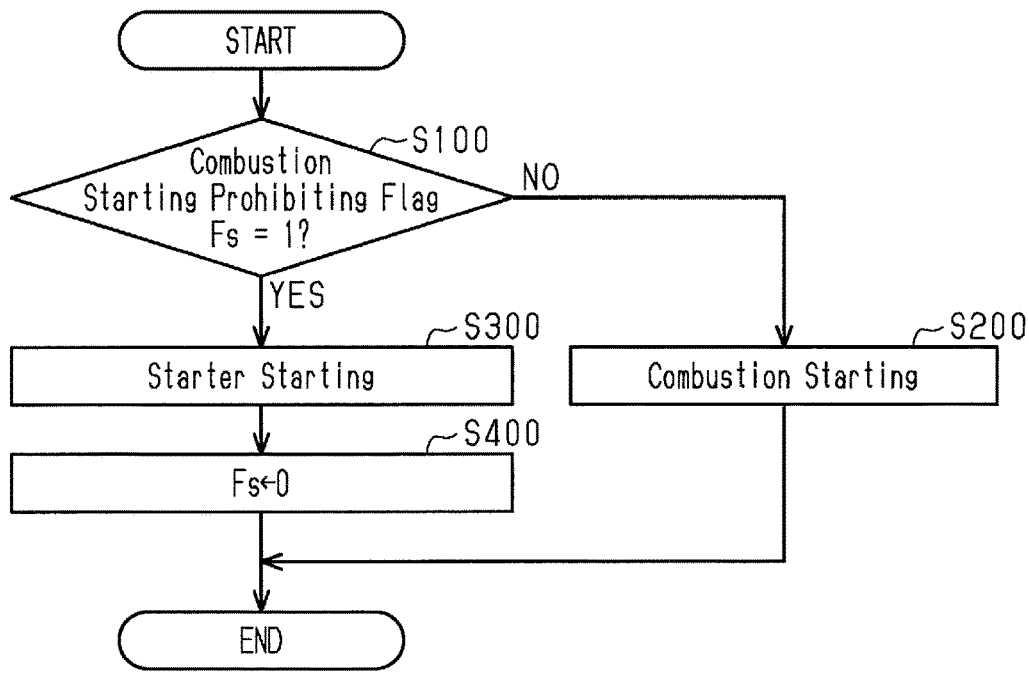
FIG. 3 is a flowchart representing a starting method switching process of the engine of FIG. 1.

With reference to FIG. 2, in response to a stop request generated at a point in time t1, the fuel injection is stopped and the engine speed NE starts to decrease gradually. There are certain cases in the stopping period (a region A1 from the point in time t1 to a point in time t2), when the crankshaft 15 rotates inertially after the fuel injection is stopped, in which it is estimated that the piston 12 in the compression stroke can pass the top dead center. In such a case, the controller 60 injects fuel into the cylinder 11 in the compression stroke in response to a restarting request. Then, after the piston 12 passes the top dead center, the controller 60 ignites and restarts the engine 1. After the engine restarting is complete, the controller 60 switches to the normal engine operation. In this case, as represented by the broken line R1 in FIG. 2, the engine speed NE rises to complete the engine restarting. In the normal engine operation, the fuel injection occurs at a later stage of the compression stroke and the ignition happens near the compression top dead center. Estimation of whether the piston 12 in the compression stroke can pass the top dead center is made depending on whether the angular speed of the crankshaft 15 at the compression top dead center is higher than a predetermined speed. That is, if the angular speed of the crankshaft 15 at the compression top dead center is higher than the predetermined speed, it is estimated that the piston 12 in the compression stroke can pass the top dead center. The predetermined speed is set to such a value that, if the angular speed of the crankshaft 15 at the compression top dead center is higher than the predetermined speed, the inertial rotation force of the crankshaft 15 at the subsequent compression top dead center will exceed the compression reaction force of the cylinder 11 in the compression stroke. In this manner, sufficient torque is applied to the crankshaft 15 in the forward rotational direction to restart the engine 1 regardless of deterioration of the engine 1 due to prolonged time of use or errors in detection of the angular speed at the compression top dead center.

There are cases (at and after the point in time t2) in which the angular speed of the crankshaft 15 at the compression top dead center is lower than or equal to the predetermined speed and it is thus estimated that the piston 12 cannot pass the compression top dead center. In such a case, as will be described below, the controller 60 changes the mode of combustion starting in correspondence with the rotational direction of the crankshaft 15 and the position of the piston 12 in the cylinder 11 in the expansion stroke.

There are certain cases (a region A2 from the point in time t2 to a point in time t3) in which the piston 12 in the cylinder 11 in the compression stroke (for example, the first cylinder 11) cannot pass the subsequent top dead center, a restarting request is generated while the crankshaft 15 is rotating in the forward rotational direction before reversing its rotational direction, and the piston 12 in the cylinder 11 in the expansion stroke (for example, the second cylinder 11) is located near top dead center. In such a case, the controller 60 injects fuel into the cylinder 11 in the expansion stroke. Then, the controller 60 carries out ignition and applies the torque in the forward rotational direction produced through combustion to the crankshaft 15 rotating in the forward rotational direction. This facilitates movement of the piston 12 in the cylinder 11 in the compression stroke for passing the top dead center. The controller 60 also injects fuel into the cylinder 11 in the compression stroke and, immediately after the piston 12 in the cylinder 11 in the compression stroke passes the top dead center, performs ignition in this cylinder 11. This rotates the crankshaft 15 in the forward rotational direction to restart the engine 1. After the engine 1 is restarted completely, the controller 60 switches to the normal engine operation. In this case, as represented by the broken line R2 in FIG. 2, the engine speed NE rises to complete engine restarting.

In contrast, there are certain cases (a region A3 from a point in time t3 to a point in time t5) in which a restarting request is generated with the crankshaft 15 rotating in the forward rotational direction but with the piston 12 in the cylinder 11 in the expansion stroke spaced from the top dead center. In such a case, even if combustion is brought about in the cylinder 11 in the expansion stroke, the piston stroke is insufficient for obtaining sufficient torque. The controller 60 therefore stands by until the crankshaft 15 temporarily switches to the reverse rotation state and the interior of the cylinder 11 in the expansion stroke is changed to the compressed state (from a point in time t4 to a point in time t5). The controller 60 then carries out combustion in the cylinder 11 in the expansion stroke.

Specifically, the controller 60 injects fuel into the cylinder 11 in the expansion stroke and stands by until the air-fuel mixture in the cylinder 11 in the expansion stroke is compressed through reverse rotation of the crankshaft 15 and then (at the point in time t5) the rotational direction of the crankshaft 15 is switched from the reverse rotational direction to the forward rotational direction. The controller 60 then carries out ignition in the cylinder 11 in the expansion stroke and thus applies the torque in the forward rotational direction to the crankshaft 15. Subsequently, the controller 60 injects fuel into the cylinder 11 in the compression stroke and stands by until the piston 12 in the cylinder 11 in the compression stroke passes the top dead center. The controller 60 then performs ignition in the cylinder 11 in the compression stroke, thereby restarting the engine 1. After engine restarting is complete, the controller 60 switches to the normal engine operation. In this case, as represented by the broken line R3 in FIG. 2, the engine speed NE rises to complete the engine restarting.

In other cases (a region A4 at and after the point in time t5 in FIG. 2), including cases in which the engine speed NE is zero, a restarting request is generated after the point in time at which first switching of rotation from the reverse rotational direction to the forward rotational direction occurs. In these cases, the controller 60 restarts the engine 1 through the starter starting.

As has been described with reference to FIG. 2, the controller 60 restarts the engine 1 basically through the combustion starting in the regions A1 to A3. However, when the engine 1 is in certain states, the combustion starting cannot produce the torque exceeding the compression reaction force acting on the cylinder 11 in the compression stroke and may thus fail.

To solve this problem, even in the regions A1 to A3 of FIG. 2, the combustion starting is prohibited when the engine 1 is in certain states, and the starting method is switched to the starter starting.

A procedure related to switching the starting methods in the regions A1 to A3 will hereafter be described. The starting method switching section 61 switches the starting methods through the series of processes represented in FIG. 3. This series of processes is performed by the starting method switching section 61 in response to a restarting request generated in the period corresponding to the regions A1 to A3 in FIG. 2 during the stopping period when fuel injection is stopped to automatically stop the engine operation.

In the series of processes started in response to the restarting request, the starting method switching section 61 first determines in Step S100 whether a combustion starting prohibiting flag Fs is 1. The initial state of the combustion starting prohibiting flag Fs is 0, indicating that the combustion starting is not prohibited. The combustion starting prohibiting flag Fs is updated to 1, indicating that the combustion starting is prohibited, through the processes that will be described with reference to FIGS. 4 and 5.

If it is determined that the combustion starting prohibiting flag Fs is not 1 in Step S100 (Step S100: NO), in other words, if the combustion starting prohibiting flag Fs is 0, the starting method switching section 61 proceeds to Step S200 and performs the combustion starting. In Step S200, the combustion starting is performed in the mode corresponding to the region in which the starting request is generated (any one of the regions A1, A2, and A3). The starting method switching section 61 then ends the series of processes.

In contrast, if the combustion starting prohibiting flag Fs is determined to be 1 in Step S100 (Step S100: YES), the starting method switching section 61 proceeds to Step S300 and performs the starter starting. The starting method switching section 61 then proceeds to Step 400 to reset the combustion starting prohibiting flag Fs to 0 and end the series of processes.

As has been described, when the combustion starting prohibiting flag Fs is 1, the starting method switching section 61 does not perform the combustion starting even if a restarting request is generated in a state corresponding to the regions A1 to A3. Instead, the starting method switching section 61 switches the starting method to the starter starting and performs the starter starting.

Figure 4:
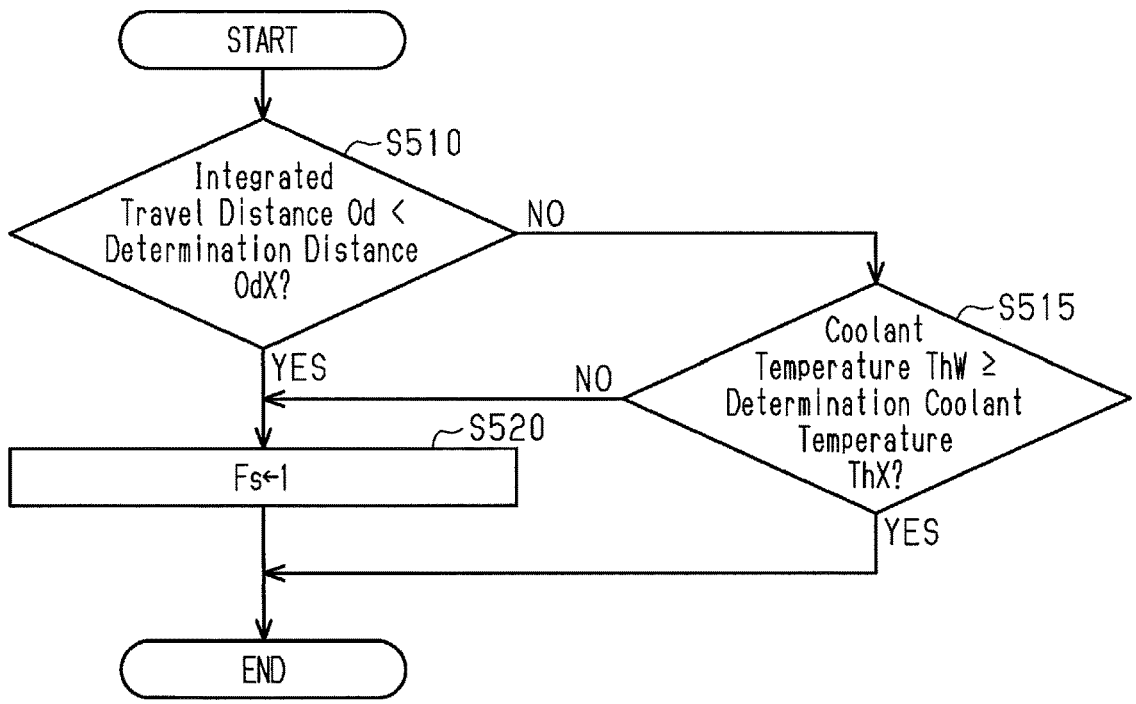
FIG. 4 is a flowchart representing a friction determining process of the engine of FIG. 1.
Figure 5:
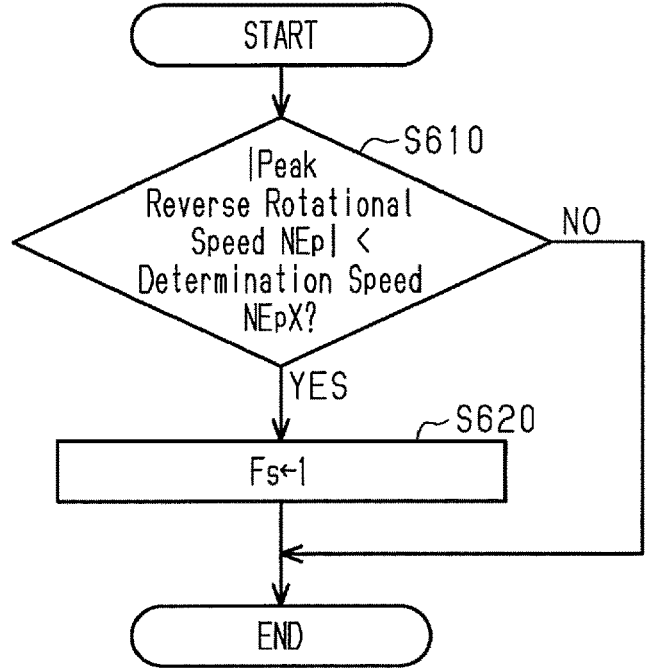
FIG. 5 is a flowchart representing a compression determining process of the engine of FIG. 1.

Next, a procedure related to updating the combustion starting prohibiting flag Fs will be described with reference to FIGS. 4 and 5. The series of processes represented in FIG. 4 is a friction determining process for determining whether the rotational resistance acting on the crankshaft 15 is of such a magnitude that the combustion starting is impossible. The series of processes represented in FIG. 5 is a compression determining process for determining whether switching of rotation of the crankshaft 15 will bring about compression necessary for the combustion starting in the cylinder 11 in the expansion stroke.

The friction determining process represented in FIG. 4 is performed by the controller 60 repeatedly at predetermined control cycles during the stopping period when the crankshaft 15 is rotating inertially after fuel injection is stopped in response to a stop request.

In the friction determining process, the controller 60 first determines in Step S510 whether the integrated travel distance Od is smaller than a determination distance OdX. Immediately after the engine 1 is produced, the slidable portions of the engine 1 are yet to be sufficiently settled in and cause great rotational resistance to the crankshaft 15. As the integrated operating amount of the engine 1 increases, the slidable portions become sufficiently settled in, thus decreasing the rotational resistance of the crankshaft 15. Therefore, when the integrated travel distance Od of the vehicle is small, it is assumed that the integrated operating amount of the engine 1 is small and the rotational resistance of the crankshaft 15 is great. The determination distance OdX is set to such a value as to allow for determination, based on the fact that the integrated travel distance Od is smaller than the determination distance OdX, that the rotational resistance acting on the crankshaft 15 is of such a magnitude that the combustion starting is impossible.

If, in Step S510, the integrated travel distance Od is determined to be smaller than the determination distance OdX (Step S510: YES), the controller 60 proceeds to Step S520 and updates the combustion starting prohibiting flag Fs to 1. The controller 60 then suspends the friction determining process.

In contrast, when, in Step S510, the integrated travel distance Od is determined to be greater than or equal to the determination distance OdX (Step S510: NO), the controller 60 proceeds to Step S515. In Step S515, the controller 60 determines whether the coolant temperature ThW is higher than or equal to a determination coolant temperature ThX. When the coolant temperature ThW is low, the temperature of lubricant is also low and the rotational resistance of the crankshaft 15 is great. Therefore, if the coolant temperature ThW is low, it is assumed that the rotational resistance of the crankshaft 15 is great. The determination coolant temperature ThX is set to such a value as to allow for determination, based on the fact that the coolant temperature ThW is lower than the determination coolant temperature ThX, that the rotational resistance of the crankshaft 15 is of such a magnitude that the combustion starting is impossible.

If, in Step S515, the coolant temperature ThW is determined to be lower than the determination coolant temperature ThX (Step S515: NO), the controller 60 proceeds to Step S520 and updates the combustion starting prohibiting flag Fs to 1. The controller 60 then suspends the friction determining process. In contrast, if the coolant temperature ThW is determined to be higher than or equal to the determination coolant temperature ThX (Step S515: YES), the controller 60 simply suspends the friction determining process without updating the combustion starting prohibiting flag Fs to 1.

When the above-described friction determining process is repeatedly performed and thus the rotational resistance of the crankshaft 15 is determined to be of such a magnitude that the combustion starting is impossible (Step S510: YES or Step S515: NO), the combustion starting prohibiting flag Fs is updated to 1. As a result, after the determination that the rotational resistance of the crankshaft 15 is of such a magnitude that the combustion starting is impossible, the starting method switching section 61 performs the starter starting in response to a restarting request through the series of processes that has been described with reference to FIG. 3.

The compression determining process will hereafter be described with reference to FIG. 5. The compression determining process is performed by the controller 60 when a peak reverse rotational speed NEp is obtained during the first reverse rotation time. The first reverse rotation time is defined as when the crankshaft 15 is rotating in a reverse rotational direction after the piston 12 of the cylinder 11 in the compression stroke cannot pass the top dead center and the rotational direction of the crankshaft 15 is switched from the forward rotational direction to the reverse rotational direction for the first tie in the stopping period. The peak reverse rotational speed NEp is the extreme value of the angular speed of the crankshaft 15 during the first reverse rotation time, which is the minimum value of the angular speed during the first reverse rotation time, that is, the maximum value of the angular speed in the reverse rotational direction.

After obtaining the peak reverse rotational speed NEp, the controller 60 starts the compression determining process. In the compression determining process, the controller 60 first determines in Step S610 whether the absolute value of the peak reverse rotational speed NEp is smaller than a determination speed NEpX.

To produce torque in the forward rotational direction by injecting fuel into the cylinder 11 in the expansion stroke through the combustion starting during the first reverse rotation time, the rotation in the reverse rotational direction must bring the piston 12 in the cylinder 11 in the expansion stroke close to the top dead center to sufficiently increase the pressure in the cylinder 11. If the absolute value of the peak reverse rotational speed NEp is great, the inertial rotation force of the crankshaft 15 in the reverse rotational direction is great. The piston 12 in the cylinder 11 in the expansion stroke is thus likely to be close to the top dead center and the combustion starting is likely to be successful. In contrast, if the absolute value of the peak reverse rotational speed NEp is small, the inertial rotation force of the crankshaft 15 in the reverse rotational direction is small. Therefore, despite the rotation in the reverse rotational direction, the piston 12 in the cylinder 11 in the expansion stroke is thus unlikely to be close to the top dead center and the combustion starting is likely to fail. The determination speed NEpX is set to such a value as to allow for determination, based on the fact that the absolute value of the peak reverse rotational speed NEp is smaller than the determination speed NEpX, that the combustion starting is impossible even if fuel is injected into the cylinder 11 in the expansion stroke.

When, in Step S610, the absolute value of the peak reverse rotational speed NEp is determined to be smaller than the determination speed NEpX (Step S610: YES), the controller 60 proceeds to Step S620 and updates the combustion starting prohibiting flag Fs to 1. The controller 60 then ends the compression determining process.

In contrast, if, in Step S610, the absolute value of the peak reverse rotational speed NEp is determined to be greater than or equal to the determination speed NEpX (Step S610: NO), the controller 60 simply ends the compression determining process without updating the combustion starting prohibiting flag Fs.

In some cases, the combustion starting prohibiting flag Fs may have been updated to 1 through the friction determining process that has been described with reference to FIG. 4 and thus be 1 at the time point at which the compression determining process is performed. In these cases, regardless of the determination result in Step S610, the combustion starting prohibiting flag Fs is maintained at 1.

Through the above-described compression determining process, the combustion starting prohibiting flag Fs is updated to 1 when the combustion starting is determined to be impossible even if fuel is injected into the cylinder 11 in the expansion stroke (Step S610: YES). As a result, if such determination is made, the starting method switching section 61 carries out the starter starting in response to a restarting request through the series of processes that has been described with reference to FIG. 3.

The above-described embodiment has the following advantages.

(1) When the rotational resistance of the crankshaft 15 is determined to be of such a magnitude that the combustion starting is impossible, the combustion starting is not performed. Instead, the starter starting is performed. The starter starting uses the torque of the starter motor 18 and thus ensures successful engine restarting more reliably than the combustion starting. As a result, despite the great rotational resistance of the crankshaft 15, engine restarting is unlikely to fail.

(2) Based on the integrated travel distance Od of the vehicle, the rotational resistance of the crankshaft 15 may be determined to be of such a magnitude that the combustion starting is impossible.

(3) Based on the coolant temperature ThW, the rotational resistance of the crankshaft 15 may be determined to be of such a magnitude that the combustion starting is impossible.

(4) A determination is made as to whether the combustion starting is impossible based on the absolute value of the peak reverse rotational speed NEp. This enables a determination in advance as to whether the combustion starting is performable after the peak reverse rotational speed NEp is obtained, thus ensuring selection of a suitable starting method in response to a restarting request based on the determination.

(5) If the compression determining process is performed alone without the friction determining process, a determination as to whether the combustion starting is performable is not allowed until the peak reverse rotational speed NEp is obtained. In contrast, as in the above-described embodiment, by performing the friction determining process in addition to the compression determining process, the combustion starting may be determined to be impossible even before the peak reverse rotational speed NEp is obtained. In this case, the starter starting is carried out in immediate response to a restarting request, thus restarting the engine 1 quickly.

The above-described embodiment may be modified as follows. The following modification may be combined as necessary.

To automatically stop the engine operation through the automatic stopping-starting control, the controller 60 may stop not only fuel injection but also ignition by means of the spark plugs 14.

The same configuration as that of the above-described embodiment is employable in a controller that controls the internal combustion engine mounted in a hybrid vehicle. That is, the configuration is employable in not only an internal combustion engine that performs such automatic stopping-starting control as to automatically stop and restart the engine when the vehicle travels at an extremely low speed immediately before stopping or is in a stopped state, but also in an internal combustion engine that is automatically stopped and restarted when the vehicle is travelling.

The friction determining process must at least ensure determination as to whether the rotational resistance acting on the crankshaft 15 is of such a magnitude that the combustion starting is impossible. For example, Step S515 of the friction determining process that has been described with reference to FIG. 4, in other words, the determination using the coolant temperature ThW as an indicator, may be omitted. In this case, a determination as to whether the rotational resistance acting on the crankshaft 15 is of such a magnitude that the combustion starting is impossible may be made using the integrated travel distance Od as a sole indicator. Also, the integrated travel distance Od does not necessarily have to be used as an indicator for the determination. As long as an indicator value correlated to the integrated operating amount of the engine 1 is used, the determination as to whether the rotational resistance acting on the crankshaft 15 is of such a magnitude that the combustion starting is impossible can be made. Therefore, instead of the integrated travel distance Od, the integrated operating time of the engine 1 may be used as an indicator for the determination. Alternatively, Step S510, in other words, the determination using the integrated travel distance Od as an indicator, may be omitted. In this case, the determination as to whether the rotational resistance acting on the crankshaft 15 is of such a magnitude that the combustion starting is impossible may be made using the coolant temperature ThW as an only indicator. Also, such determination using the coolant temperature ThW as an indicator may be replaced by determination using the lubricant temperature as an indicator. Further, the determination using the coolant temperature ThW as an indicator may be replaced by determination using any other indicator value that is used to determine whether engine warmup is complete.

The friction determining process that has been described with reference to FIG. 4 may be replaced by the friction determining process represented in FIG. 6. In the friction determining process of FIG. 6, the rotational resistance is determined to be of such a magnitude that the combustion starting is impossible if an ISC correction amount is greater than or equal to a determination value X. The ISC correction amount is a correction amount used to increase the opening degree of the throttle valve 33 in the idle-speed control before fuel injection is stopped to switch to the stopping period.

Figure 6:
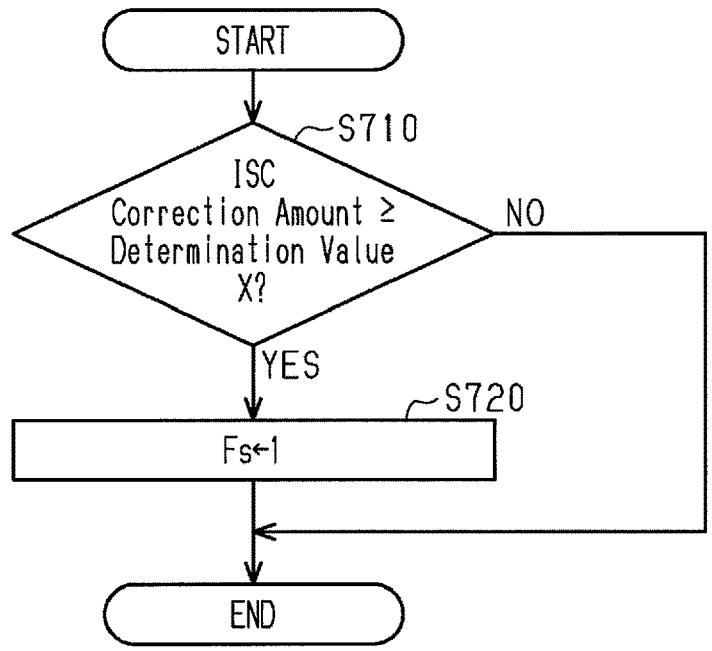
FIG. 6 is a flowchart representing a friction determining process of a modification.

The friction determining process represented in FIG. 6 is performed by the controller 60 repeatedly at predetermined control cycles in the stopping period, like the friction determining process that has been described with reference to FIG. 4.

In the friction determining process of FIG. 6, the controller 60 first determines in Step S710 whether the ISC correction amount in the idle-speed control before fuel injection is stopped to switch to the stopping period is greater than or equal to the determination value X. When great rotational resistance acts on the crankshaft 15, the engine speed NE is maintained by employing a great ISC correction amount in the idle-speed control to ensure a correspondingly great opening degree of the throttle valve 33. That is, the greater the rotational resistance of the crankshaft 15, the greater the ISC correction amount in the idle-speed control becomes. Therefore, if the ISC correction amount in the idle-speed control before switching to the stopping period is great, it can be assumed that the rotational resistance of the crankshaft 15 during idling has been great. The determination value X is set to such a value as to allow for determination, based on the fact that the ISC correction amount is greater than or equal to the determination value X, that the rotational resistance acting on the crankshaft 15 is of such a magnitude that the combustion starting is impossible.

If, in Step S710, the ISC correction amount is determined to be greater than or equal to the determination value X (Step S710: YES), the controller 60 proceeds to Step S720 and updates the combustion starting prohibiting flag Fs to 1. The controller 60 then suspends the friction determining process.

In contrast, if, in Step S710, the ISC correction amount is determined to be smaller than the determination value X (Step S710: NO), the controller 60 simply suspends the friction determining process without updating the combustion starting prohibiting flag Fs to 1.

Also when the above-described friction determining process is repeatedly performed and thus the rotational resistance of the crankshaft 15 is determined to be of such a magnitude that the combustion starting is impossible (Step S710: YES), the combustion starting prohibiting flag Fs is updated to 1. Therefore, if the rotational resistance of the crankshaft 15 is determined to be of such a magnitude that the combustion starting is impossible, the starting method switching section 61 carries out the starter starting in response to a restarting request through the series of processes that has been described with reference to FIG. 3. That is, employing the friction determining process of FIG. 6 allows for determination that the rotational resistance of the crankshaft 15 is of such a magnitude that the combustion starting is impossible based on the ISC correction amount.

The combustion starting is thus prohibited based on such determination and the starter starting is carried out.

The ISC correction amount is varied depending on whether the air conditioner 90 is on or off in correspondence with the operating condition of the alternator 80 or depending on whether the shift position of the transmission is N, which is the neutral position, or D, which is the forward traveling position. Specifically, the ISC correction amount is greater when the air conditioner 90 is on than when it is off, greater when the amount of electric power generated by the alternator 80 is great than when it is small, and greater when the shift position is D than when it is N. Therefore, the determination value X may be set to be varied in correspondence with the state of idling before switching to the stopping period or a state at the time when a restarting request is made.

The timings and frequency at which the friction determining process is carried out may be changed as needed. For example, the friction determining process may be performed only during the first reverse rotation time. To perform the combustion starting during the first reverse rotation time, in which the crankshaft 15 is rotating in the reverse rotational direction, the rotational direction of the crankshaft 15 must be pushed back in the forward rotational direction through fuel injection and ignition. The combustion starting thus tends to be influenced by the rotational resistance acting on the crankshaft 15 and is likely to fail if the rotational resistance is great. The friction determining process thus may be performed only during the first reverse rotation time. That is, if the rotational resistance is relatively small and it is assumed that the combustion starting will not be impossible by being influenced by the rotational resistance in the regions A1 and A2, which have been described with reference to FIG. 2, the friction determining process may be performed only during the first reverse rotation time.

Alternatively, the friction determining process may be carried out only once when a stop request is generated, for example. That is, the combustion starting may be prohibited based on the rotational resistance at the time point at which the stop request is generated. However, to improve the accuracy of determination as to whether the rotational resistance is of such a magnitude that the combustion starting is impossible, it is preferable that the combustion starting be prohibited based on the rotational resistance at the time when a restarting request is generated. This makes it preferable that, as in the above-described embodiment, the friction determining process be performed repeatedly during the stopping period.

The compression determining process, which has been described with reference to FIG. 5, may be omitted.

The controller 60 may have a friction determining section and a compression determining section. The friction determining section and the compression determining section perform the friction determining process and the compression determining process, respectively. Also, an alternative configuration may be employed such that the starting method switching section 61 carries out the friction determining process and/or the compression determining process.

The controller 60 can be constructed by a device that includes a CPU and a ROM and executes software processing, but is not limited to this configuration. For example, at least part of the processes executed by the software in the above-illustrated embodiment may be executed by hardware circuits dedicated to executing these processes (such as ASIC). That is, the controller may be modified as long as it has any one of the following configurations (a) to (c). (a) A configuration including a processor (processing device) that executes all of the above-described processes according to programs and a program storage device such as a ROM (including a non-transitory computer-readable medium) that stores the programs. (b) A configuration including a processor and a program storage device that execute part of the above-described processes according to the programs and a dedicated hardware circuit that executes the remaining processes. (c) A configuration including a dedicated hardware circuit that executes all of the above-described processes. A plurality of software processing circuits each including a processor and a program storage device and a plurality of dedicated hardware circuits may be provided. That is, the above processes may be executed in any manner as long as the processes are executed by processing circuitry that includes at least one of a set of one or more software processing circuits and a set of one or more dedicated hardware circuits.

The invention claimed is:

1. A controller for an internal combustion engine, the engine including a direct injection valve, a spark plug, and a starter motor, wherein the controller includes a starting method switching section, wherein the starting method switching section is configured to select and perform either starter starting or combustion starting in response to a restarting request generated during a stopping period, in which fuel injection is stopped to automatically stop engine operation, and the starting method switching section is configured to restart the engine using the starter motor in the starter starting and to restart the engine through the fuel injection and ignition without using the starter motor in the combustion starting, the controller is configured to perform a determining process for determining whether a rotational resistance acting on a crankshaft of the engine is of such a magnitude that the combustion starting is impossible, and the starting method switching section is configured to carry out the starter starting in response to the restarting request generated during the stopping period if, through the determining process, the rotational resistance is determined to be of such a magnitude that the combustion starting is impossible, wherein the engine is a vehicle-mounted internal combustion engine mounted in a vehicle as a drive source, and the controller is configured to determine, in the determining process, that the rotational resistance is of such a magnitude that the combustion starting is impossible if an integrated travel distance of the vehicle is smaller than a determination distance.

2. The controller for an internal combustion engine according to claim 1, wherein the controller is configured to determine, in the determining process, that the rotational resistance is of such a magnitude that the combustion starting is impossible if the temperature of an engine coolant is lower than a determination coolant temperature.

3. The controller for an internal combustion engine according to claim 1, wherein a first reverse rotation time is defined as when the crankshaft is rotating in a reverse rotational direction after a piston of a cylinder in a compression stroke cannot pass a top dead center and a rotational direction of the crankshaft is switched from a forward rotational direction to a reverse rotational direction for the first time in the stopping period, and the controller is configured to
during the first reverse rotation time, produce a torque in the forward rotational direction in the combustion starting by injecting fuel into a cylinder in an expansion stroke and igniting air-fuel mixture that has been compressed through rotation in the reverse rotational direction, and
perform the determining process only during the first reverse rotation time.

4. The controller for an internal combustion engine according to claim 1, wherein
a first reverse rotation time is defined as when the crankshaft is rotating in a reverse rotational direction after a piston of a cylinder in a compression stroke cannot pass a top dead center and a rotational direction of the crankshaft is switched from a forward rotational direction to a reverse rotational direction for the first time in the stopping period, and
the controller is further configured to
during the first reverse rotation time, produce a torque in the forward rotational direction in the combustion starting by injecting fuel into a cylinder in an expansion stroke and igniting air-fuel mixture that has been compressed through rotation in the reverse rotational direction, and
also, during the first reverse rotation time, obtain a peak reverse rotational speed, which is an extreme value of an angular speed of the crankshaft, and carry out a compression determining process for determining that the combustion starting is impossible based on the fact that an absolute value of the obtained peak reverse rotational speed is smaller than a determination speed, and
the starting method switching section is configured to perform the starter starting in response to a restarting request generated during the stopping period if the combustion starting is determined to be impossible through the compression determining process.

5. A control method for an internal combustion engine, the engine including a direct injection valve, a spark plug, and a starter motor, wherein
the control method includes
selecting and performing either starter starting or combustion starting in response to a restarting request generated during a stopping period, in which fuel injection is stopped to automatically stop engine operation, the engine being restarted using the starter motor in the starter starting and the engine being restarted through the fuel injection and ignition without using the starter motor in the combustion starting,
determining whether a rotational resistance acting on a crankshaft of the engine is of such a magnitude that the combustion starting is impossible, and
carrying out the starter starting in response to the restarting request generated during the stopping period if the rotational resistance is determined to be of such a magnitude that the combustion starting is impossible, wherein
the engine is a vehicle-mounted internal combustion engine mounted in a vehicle as a drive source, and
the control method includes determining that the rotational resistance is of such a magnitude that the combustion starting is impossible if an integrated travel distance of the vehicle is smaller than a determination distance.

6. A controller for an internal combustion engine, the engine including a direct injection valve, a spark plug, and a starter motor, wherein
the controller includes a starting method switching section, wherein
the starting method switching section is configured to select and perform either starter starting or combustion starting in response to a restarting request generated during a stopping period, in which fuel injection is stopped to automatically stop engine operation, and
the starting method switching section is configured to restart the engine using the starter motor in the starter starting and to restart the engine through the fuel injection and ignition without using the starter motor in the combustion starting,
the controller is configured to perform a determining process for determining whether a rotational resistance acting on a crankshaft of the engine is of such a magnitude that the combustion starting is impossible, and
the starting method switching section is configured to carry out the starter starting in response to the restarting request generated during the stopping period if, through the determining process, the rotational resistance is determined to be of such a magnitude that the combustion starting is impossible, wherein
the controller is further configured to perform an idle-speed control for adjusting an engine speed by correcting an opening degree of a throttle valve of the engine during idling, and
the controller is configured to determine, in the determining process, that the rotational resistance is of such a magnitude that the combustion starting is impossible if a correction amount used to increase the opening degree of the throttle valve in the idle-speed control before the fuel injection is stopped to switch to the stopping period is greater than or equal to a determination value.

7. A non-transitory computer-readable memory medium that stores a program that causes a processing device to perform a control process for an internal combustion engine, the engine including a direct injection valve, a spark plug, and a starter motor, wherein
the control process includes
selecting and performing either starter starting or combustion starting in response to a restarting request generated during a stopping period, in which fuel injection is stopped to automatically stop engine operation, the engine being restarted using the starter motor in the starter starting and the engine being restarted through the fuel injection and ignition without using the starter motor in the combustion starting,
determining whether a rotational resistance acting on a crankshaft of the engine is of such a magnitude that the combustion starting is impossible, and
carrying out the starter starting in response to the restarting request generated during the stopping period if the rotational resistance is determined to be of such a magnitude that the combustion starting is impossible, wherein
a first reverse rotation time is defined as when the crankshaft is rotating in a reverse rotational direction after a piston of a cylinder in a compression stroke cannot pass a top dead center and a rotational direction of the crankshaft is switched from a forward rotational direction to a reverse rotational direction for the first time in the stopping period, and the control process includes during the first reverse rotation time, producing a torque in the forward rotational direction in the combustion starting by injecting fuel into a cylinder in an expansion stroke and igniting air-fuel mixture that has been compressed through rotation in the reverse rotational direction, and performing the determining whether the rotational resistance is of such a magnitude that the combustion starting is impossible only during the first reverse rotation time.

* * * * *